United States Patent [19]
Maerz

[11] 3,742,802
[45] July 3, 1973

[54] SHEET MATERIAL CUTTING APPARATUS INCLUDING A VACUUM HOLDDOWN SYSTEM HAVING A ROLLER MECHANISM FOR HANDLING AIR-IMPERMEABLE SHEETS

[75] Inventor: Robert J. Maerz, West Hartford, Conn.

[73] Assignee: Gerber Garment Technology, Inc., East Hartford, Conn.

[22] Filed: Apr. 6, 1972

[21] Appl. No.: 241,643

[52] U.S. Cl. ................ 83/451, 83/925 CC, 269/21
[51] Int. Cl. .............................................. B26d 7/02
[58] Field of Search ............. 83/374, 451, 925 CC; 269/21

[56] References Cited
UNITED STATES PATENTS
3,495,492  2/1970  Gerber et al. ................... 83/374

Primary Examiner—J. M. Meister
Attorney—Donald K. Huber et al.

[57] ABSTRACT

A sheet material cutting apparatus of the type wherein a layup of sheet material is spread onto the supporting surface of a cutting table and held to the cutting table in a compressed condition by vacuum applied to an overlying sheet or panel of air-impervious material includes a roller mechanism for handling the air-impervious panel whereby such a panel is removed from the layup at the cutting zone so as not to be cut by the cutting tool. The roller mechanism includes two rollers located on opposite sides of the cutting tool with the air-impervious panel comprising two sheets each partially rolled onto a respective one of the two rollers.

11 Claims, 6 Drawing Figures

PATENTED JUL 3 1973 3,742,802
SHEET 1 OF 2
FIG. 1
FIG. 2
FIG. 3
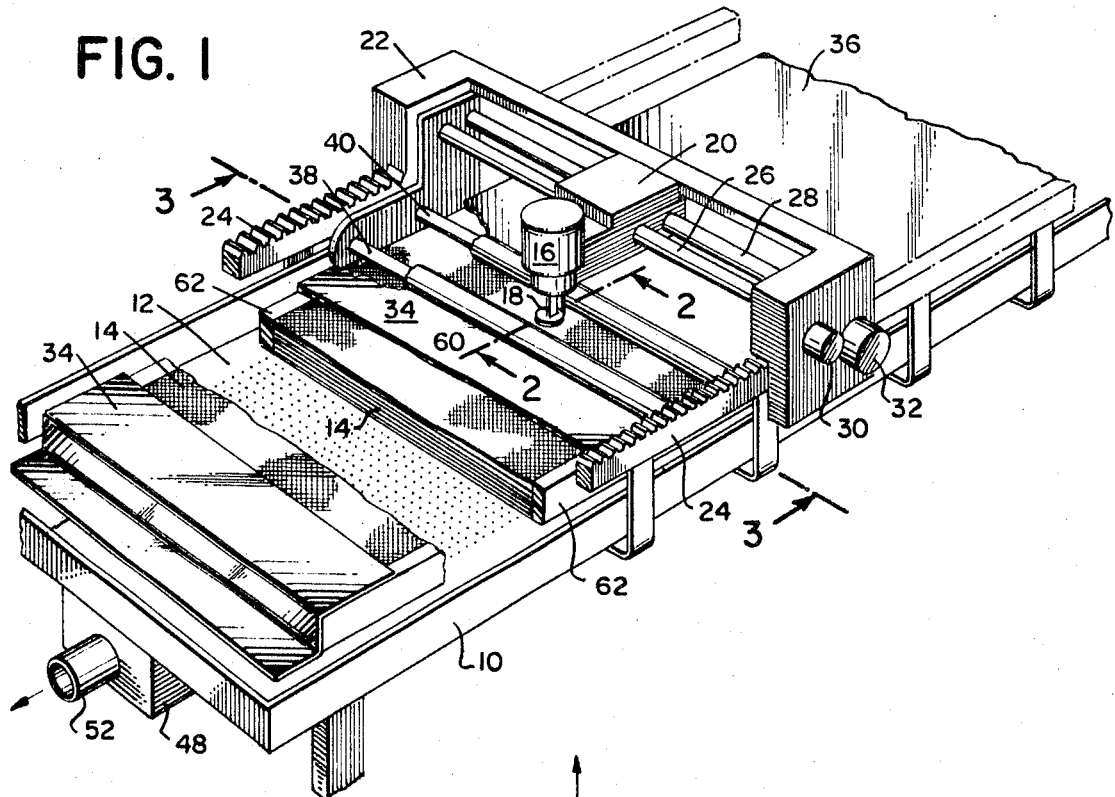
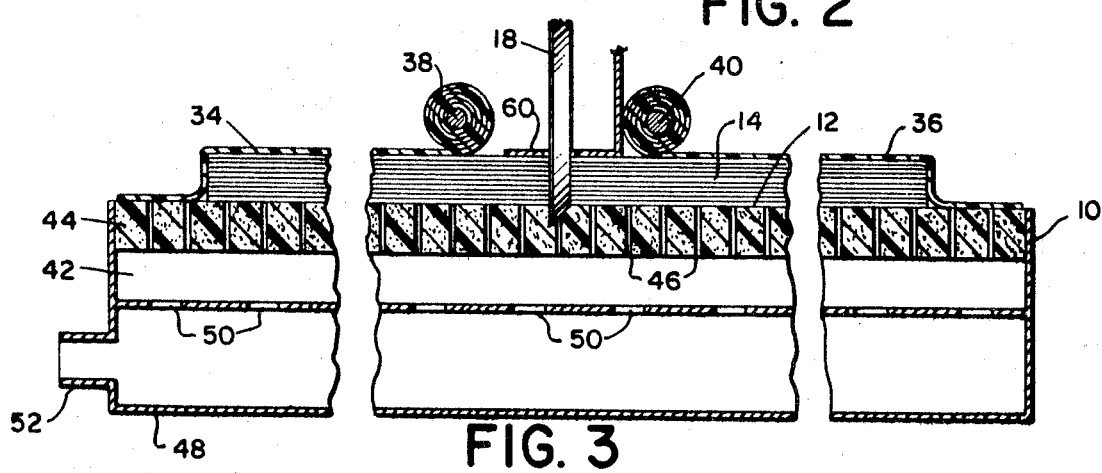
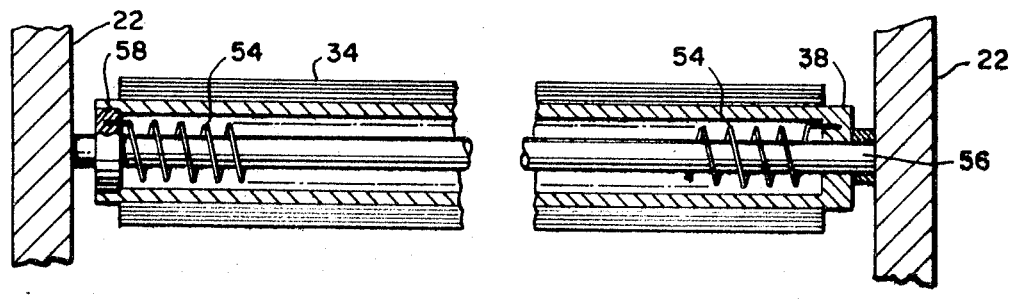

SHEET MATERIAL CUTTING APPARATUS INCLUDING A VACUUM HOLDDOWN SYSTEM HAVING A ROLLER MECHANISM FOR HANDLING AIR-IMPERMEABLE SHEETS

BACKGROUND OF THE INVENTION

This invention relates to apparatus for cutting layups of fabric or other sheet material for producing parts for garments, upholstery or the like, and deals more particularly with such an apparatus wherein the layup is held during cutting in a compressed rigid condition by an overlying air-impervious cover sheet or panel attracted to the layup by vacuum and acting to thereby press the layup between the panel and the supporting surface. Still more particularly, the invention relates to a roller mechanism for handling the air-impermeable sheet whereby the sheet is removed from the layup at the cutting zone so as to prevent it from being cut by the cutting tool and thereby allowing it to be reused with subsequent layups. A cutting apparatus of the type with which this invention is concerned is shown in prior U.S. Pat. No. 3,495,492, which shows various different embodiments of such apparatus comprised of a supporting surface means for supporting a layup of sheet material to be cut, an overlying air-impermeable cover sheet, a vacuum means for applying a sub-atmospheric pressure to the overlying sheet, and a cutter for cutting the layup while it is held in a compressed condition by the cooperation of the overlying sheet with the vacuum means and supporting surface. In most of these embodiments, however, the overlying air-impermeable sheet is cut by the cutting tool along with the layup so that the sheet is destroyed with the cutting of the layup and with the result that a new cover sheet must be supplied for each layup. Usually the cover sheet may be made of a relatively thin and inexpensive plastic material so that the need for providing a new one of such sheets for each layup is not prohibitive. However, in some cases it may be desirable to use a heavier or otherwise more expensive sheet as the cover sheet and in such cases it is naturally desirable that the cover sheet not be destroyed with the cutting of the layup and instead be capable of repeated use with many layups.

The roller mechanism of this invention serves the purpose of handling two complementary cover sheets, each overlying a separate portion of the layup, so as to allow the sheets to be used as part of the vacuum holddown system while nevertheless preventing them from being cut by the cutting tool, and the mechanism is therefore an improvement on the various embodiments of the cutting apparatus shown in said prior U.S. Pat. No. 3,495,492.

SUMMARY OF THE INVENTION

This invention resides in a sheet material cutting apparatus of the type having a table providing a cutting surface for supporting a layup of sheets of fabric or other sheet material to be cut. A cutter is movable over the layup along any desired line of cut by means of a main carriage movable longitudinally of the table and a secondary carriage carried by the main carriage and movable relative thereto transversely of the table, the cutter being carried by the secondary carriage. To hold the layup in a compressed condition while it is being cut by the cutter, a vacuum holddown system is provided which includes two rotatable rollers carried by the main carriage for movement therewith longitudinally of the supporting surface with the rollers extending transversely of the surface and being located on opposite sides of the cutting zone. The two rollers handle two sheets of air-impervious sheet material each having a portion wound on its respective roller and another portion overlying a part of the layup. A vacuum system produces a sub-atmospheric pressure adjacent the undersurfaces of the two cover sheets so that atmospheric pressure pushes them toward the supporting surface to compress the layup between them and the supporting surface. A biasing means biases the rollers in their winding directions so that as the main carriage is moved longitudinally of the supporting surface one of the sheets is wound onto its roller by the action of its biasing means and the other of the two sheets is unwound from its roller against the action of its biasing means. In this manner all of the layup is maintained covered by the two cover sheets except for the area located between the two rollers and the cutter works in this gap so as not to cut either of the cover sheets during operation.

BRIEF DESCRIPTION OF THE DRAWING

FIG. 1 is a perspective view showing a cutting apparatus embodying the present invention.

FIG. 2 is a longitudinal sectional view of the apparatus of FIG. 1.

FIG. 3 is a transverse sectional view showing on an enlarged scale one of the rollers of the apparatus of FIG. 1, this view being taken on the line 3—3 of FIG. 1.

DETAILED DESCRIPTION OF THE PREFERRED EMBODIMENT

Figure 4:
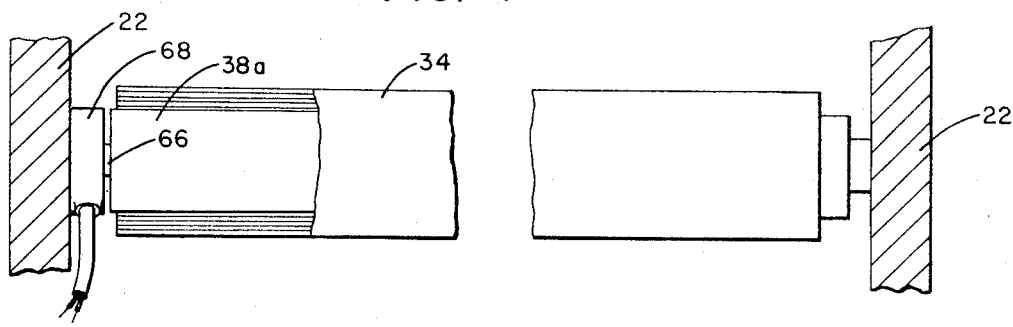
FIG. 4 is a view similar to FIG. 3 but shows a roller with an alternative form of biasing means.

Turning to the drawings and first considering FIG. 1, the present invention is there shown embodied in a sheet material cutting apparatus comprising a table 10 having an upwardly facing supporting surface 12 for supporting a layup 14 consisting of a plurality of superimposed layers of fabric or other sheet material to be cut.

For performing the actual cutting of the layup 14 the apparatus 10 includes a cutter 16 which is movable in two coordinate directions relative to the layup 14 so as to be capable of following any desired line of cut located in the plane of the layup. The cutter may take various different forms, but in the illustrated case is of the type including a reciprocating knife 18 which during cutting passes generally vertically through the layup. The cutter 16 is carried by a secondary carriage 20 which in turn is carried by a main carriage 22. The main carriage 22 is movable longitudinally of the table 10 and is driven in such movement by two pinions, not shown, meshing with two parallel racks 24, 24 extending along opposite sides of the table. The secondary carriage 20 is in turn movable transversely of the table and of the main carriage 22. The means for so moving the secondary carriage 20 includes a lead screw 26 and a guide tube 28 forming part of the main carriage. The lead screw 26 is driven by a motor 30 mounted on one end of the main carriage, and another motor 32, also mounted on the main carriage, drives the pinions which engage with the racks 24, 24 to move the main carriage longitudinally. A suitable control means, not shown, provides energizing signals to the motors 30 and 32 to cause the cutter 16 to be moved along the desired line of cut.

A vacuum holddown system is included in the apparatus 10 for holding the layup 14 in a compressed condition during cutting by the cutter 16. This system includes two cover sheets 34 and 36 overlying different portions of the layup 14 and handled by two rollers 38 and 40 respectively, as best shown in FIG. 2. The two rollers 38 and 40 extend transversely of the table 10 and are located on opposite sides of the cutting zone, that is, the point at which the knife 18 penetrates the layup. The rollers 38 and 40 are carried by the main carriage 22 and therefore move longitudinally of the layup with the cutter 16. The sealing sheet 34 extends from one end of the layup 14 to the roller 38 and has a portion of itself wound on that roller. Likewise, the other sheet 36 extends from the other end of the layup 14 to the roller 40 and has a part of itself wound on that roller, the direction of winding of the two sheets 34 and 36 being in opposite directions on their rollers 38 and 40.

The two cover sheets 34 and 36 cooperate with a vacuum means which produces a sub-atmospheric pressure adjacent the undersurfaces of the sheets so as to cause the sheets to be pushed by atmospheric pressure toward the supporting surface 12 to thereby compress the layup 14 between them and the supporting surface. This vacuum means may take many different forms without departing from the invention, but in the present case consists of a vacuum chamber 42 located below a bed of material 44 defining the material supporting surface 12 of the table 10. The bed of material 44 is comprised of a foamed plastic, such as polyurethane, which is readily penetrable by the knife 18 and which includes a large number of openings 46, 46 providing air communication between the vacuum chamber 42 and the supporting surface 12. Below the vacuum chamber 42 is a vacuum duct 48 which extends the length of the table 10 and communicates with the chamber 42 through a number of openings 50, 50. The duct 48 is in turn connected to a suitable source of vacuum, not shown, by the conduit 52, at its illustrated left-hand end. In the illustrated case, the layup 14 is air-permeable and subatmospheric pressure is conducted to the undersurfaces of the sealing sheets 34, 36 by or through the layup 14 itself.

The two rollers 38 and 40 are biased in their winding directions so that as they and the cutter 16 move longitudinally of the table 10 one of the sheets is wound onto its roller under the action of its biasing means while the other sheet is unwound from its roller against the action of its biasing means. For example, in FIG. 2, if the cutter and knife 18 are moved to the left the sheet 34 is wound onto its roller 38 while the sheet 36 is unwound from its roller 40 thereby maintaining the gap between the two rolls uncovered by either of the sealing sheets. Likewise, if the cutter is moved to the right the sheet 36 is wound onto the roller 40 while the sheet 34 is unwound from the roller 38.

Various mechanical or electrical biasing means may be provided for biasing the rollers 38 and 40 and by way of example FIG. 3 shows a suitable simple mechanical biasing means. Referring to this figure, the illustrated roller 38 is hollow along the major portion of its length and receives a helical torsion spring 54. At its illustrated right-hand end the roller 38 is of a reduced diameter and rotatably engages an axle 56 fixed at both ends to the carriage 22. The axle 56 extends through the roller and adjacent its left-hand end includes an enlarged cylindrical shoulder 58 rotatably engaged by the left-hand end of the roller. The helical torsion spring 54 is received on the axle 56 and at its right-hand end is fixed to the adjacent end of the roller, its left-hand end being fixed to the shoulder 58 of the axle 56. Prior to being put into use the roller 38 is rotated a number of times so that sufficient bias force is that a by the spring 54 on the roller at all longitudinal positions of the carriage 22. The roller 40 is of a similar construction and operation.

From the foregoing description it will be understood that in the operation of the cutting apparatus of FIGS. 1 to 3, the cutting knife 18 of the cutter 16 works at a cutting zone located between the two rollers 38 and 40 which in rolling up and unwinding the sheets 34 and 36 leave the gap between the rollers unexposed by any cover sheet, the sheets being wound onto and unwound from the rollers as the cutter moves longitudinally of the table and layup and the cutter also moving transversely in the gap so as to be capable of following any desired line of cut. If desired, an additional mechanical holding means, movable longitudinally with the carriage 22, may be used in the gap between the two rollers 38, 40 to press against the material of the layup in the gap, such apparatus for example, being shown in FIGS. 1 and 2 as a presser foot 60 surrounding the knife 18 and movable therewith in both coordinate directions.

Also, for best handling of the cover sheets 34, 36, it is desirable that they do not drape over the side edges of the layup 14. Therefore, the layup 14 is preferably supplemented by two edge members 62, 62 which extend longitudinally along the side edges of the layup and which are of approximately the same height as the layup. These edge members are of a suitable material or construction as to isolate the edges of the layup from the atmosphere and may, for example, be made of an air-impervious plastic foam. The two sheets 34 and 36 are, as illustrated in FIG. 1, of a sufficient transverse width as to overlie the full extent of the layup 14 and at least partially overlie each of the two edge members 46, 46. Therefore, the two edge members 62 and 64 in cooperation with the cover sheets 34 and 36 completely seal the layup from the atmosphere except for the area of the layup located within the gap between the two rollers at the work zone.

As mentioned, various different biasing means may be used for biasing the rollers used to handle the cover sheets, and a simple mechanical biasing means has been shown in FIG. 3. Turning to FIG. 4, this figure shows an alternative electrical biasing means which may be used in place of the mechanical biasing means of FIG. 3. In the construction of FIG. 4 the illustrated roller 38a is or may be solid throughout its entire length and has a cylindrical outer surface onto which is wrapped a portion of the associated cover sheet 34. At its right-hand end the roller 38a is rotatably supported by the main frame 22. At its left-hand end the roller 38a is connected through a short shaft 66 to the rotor of an electric motor 68. The motor 68 is positioned between the left-hand end of the roller 38a and the main carriage 22 and has its housing fixed to the main carriage.

The motor 68 is a torque motor which when energized exerts a torque on the roller 38a tending to rotate the roller in the winding direction. Therefore, as the main carriage 22 and roller 38a move in one longitudinal direction relative to the cutting table, the motor 68 rotates the roller 38a to wind the cover sheet 34 onto the roller, and when the main carriage and roller move in the opposite longitudinal direction, the motor 68 exerts a torque on the roller which yieldingly resists the unwinding of the cover sheet 34 from the roller. The motor 68 may be constantly energized to the same degree throughout a cutting operation so that the torque imposed on the roller 38a remains constant regardless of the longitudinal direction of travel of the main carriage and roller. However, if desired, the energization of the motor 68 may also be varied by the associated controller so that one degree of energization is applied to it when the roller moves longitudinally of the table in the winding direction and another, lower, degree of energization is applied to it when the roller moves longitudinally of the table in the unwinding direction. Of course, it will be understood that a similar torque motor is used with the other roller of the cutting apparatus and is energized in the same manner as the illustrated motor 68.

In the embodiment of the invention shown in FIGS. 1 to 3, the supporting surface 12 is provided by a bed of foamed plastic having openings therethrough through which vacuum is conducted to the layup to be cut, and the layup is permeable so that the vacuum is conducted through the layup to the overlying cover sheets, each of the cover sheets being a thin sheet of plastic having substantially planar surfaces on both sides.

Figure 5:
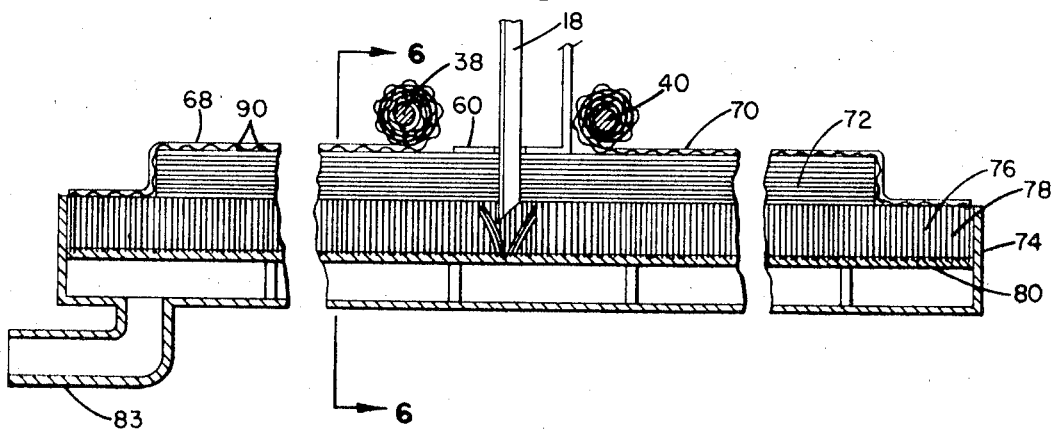
FIG. 5 is a view similar to FIG. 2 of a cutting apparatus comprising another embodiment of this invention.
Figure 6:
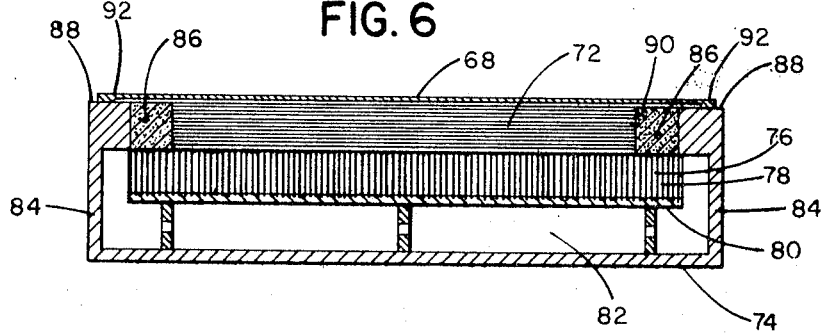
FIG. 6 is a transverse sectional view taken on the line 6—6 of FIG. 5.

Turning to FIGS. 5 and 6, these figures show another embodiment of the invention wherein the cover sheets, indicated at 68 and 70, instead of merely having two planar surfaces each include an undersurface, facing the layup to be cut, formed with channels or grooves which, after the sheet is placed on top of the layup, permit the flow of air transversely of the layup between the cover sheet and the top surface of the layup. Such a cover sheet is, therefore, of particular usefulness in cases where the layup is comprised of air-impermeable sheets so that the vacuum cannot be conducted to the undersurface of the cover sheets by flowing vertically through the layup from the supporting surface of the table.

In FIGS. 5 and 6 the layup is indicated at 72 and may be considered to be made up of air-impermeable sheets such as thin sheets of vinyl plastic. The cutting table 74 includes a bed 76 comprised of a large number of vertical bristles 78 fixed at their lower ends to a base member 80. Below the base member 80 is a vacuum chamber 82 connected to a source of vacuum through the conduit 83. As shown best in FIG. 6, the base 80 of the bristle bed 76 is spaced from the longitudinal sidewalls 84, 84 of the table so that vacuum from the vacuum chamber 82 may flow around the longitudinal side edges of the base into the space occupied by the bristles. Along each side edge of the layup 72 is placed an edge member 86 of air-permeable material such as open cell plastic foam or felt. The members 86, 86 are of such a height that when they and the layup 72 are compressed by the cover sheet 68 or 70, by the application of vacuum hereinafter described, the top surfaces of the edge members and of the layup are located approximately in the same plane. The sidewalls 84, 84 of the table also include upwardly facing top edges 88, 88 which are at approximately the same level as the top surfaces of the edge members 86, 86 and of the layup when the vacuum system is in operation.

The manner in which the cover sheets are configured on their bottom surfaces to provide air conducting channels may vary greatly, but in the illustrated case the cover sheets 68 and 70 by way of example both have their undersurfaces configured to provide a plurality of transversely extending grooves 90, 90 giving the undersurface of each sheet a generally corrugated effect. As shown best in FIG. 6, each groove 90 of each cover sheet at each side edge of the cover sheet extends outwardly beyond the associated air-permeable strip 86 but terminates short of the edge of the cover sheet. Therefore, along each side edge of each cover sheet is a marginal portion 92 having a flat downwardly facing surface which forms a seal against the adjacent top edge 88 of the table to prevent the escape of vacuum.

Except for the differences described above the remaining parts of the apparatus of FIGS. 5 and 6 may be the same as those of the apparatus of FIGS. 1 to 3. In particular, the two cover sheets 68 and 70 are wound, respectively, on rollers 38 and 40 each biased on the winding direction and carried by the main carriage for movement longitudinally of the cutting table, the two rollers being located on opposite sides of the cutting knife 18.

In the operation of the device of FIGS. 5 and 6 vacuum from the vacuum chamber 82 flows around the edges of the base member 80 of the bristle bed 76 and into the body of the bed made up of the bristles 78. From this body of the bed the vacuum passes into the air-permeable edge members 86, 86 and through such members to the transversely extending channels 90, 90 provided by the cover sheets 68 and 70. The channels in turn transmit the vacuum transversely across the top surface of the layup 72 so that a sub-atmospheric pressure is produced between the cover sheets and the layup causing the cover sheets to be pressed by atmospheric pressure toward the supporting surface provided by the bristle bed thereby compressing the layup between the cover sheets and the bristle bed. As the cutting tool moves longitudinally of the cutting table the two rollers 38 and 40 wind and unwind the cover sheets in the same manner as described above in connection with FIGS. 1 to 3 to uncover the layup at the cutting zone and to prevent the cover sheets from being cut by the cutting tool. It will be appreciated that because of the special configuration applied to the undersurface of the cover sheets 68 and 70 such sheets are generally more expensive to produce than more ordinary sheets having planar surfaces. Therefore, the use of the rollers of this invention to prevent the cutting of such sheets is especially desirable and advantageous.

I claim:

1. A sheet material cutting apparatus comprising a table having a surface for supporting a layup of sheets of material to be cut, a main carriage connected with said table for movement longitudinally of said supporting surface, a cutter connected with said main carriage for movement therewith longitudinally of said supporting surface and operable to cut said layup of sheet material supported by said supporting surface at a cutting zone which moves with said cutter relative to said layup, two rotatable rollers carried by said main carriage for movement therewith longitudinally of said supporting surface, said two rollers extending transversely of said supporting surface and being located on opposite sides of said cutting zone, two cover sheets of air-impervious sheet material each associated with a respective one of said rollers, said two cover sheets including portions wound respectively onto said two rollers in opposite directions and other portions extending in opposite directions from said cutting zone into overlying relationship with said layup with the portion of said layup located below the gap between said two rollers being uncovered by said cover sheets, means for producing a sub-atmospheric pressure adjacent the undersurfaces of said two cover sheets so that atmospheric pressure pushes them toward said supporting surface to compress said layup between said cover sheets and said supporting surface, and means for biasing each of said rollers about its axis of rotation in the direction to wind its associated sheet thereon so that as said main carriage moves longitudinally of said supporting surface one of said sheets is wound onto its roller by the action of its biasing means and the other of said two sheets is unwound from its roller against the action of its biasing means.

2. A sheet material cutting apparatus as defined in claim 1 further characterized by a secondary carriage carried by said main carriage and movable relative to said main carriage transversely of said supporting surface, said cutter being carried by said secondary carriage.

3. A sheet material cutting apparatus as defined in claim 1 further characterized by said means for biasing each of said rollers comprising for each of said rollers a spring working between said main carriage and said roller for urging said roller in one direction about its axis of rotation.

4. A sheet material cutting apparatus as defined in claim 1 further characterized by each of said rollers being hollow along a portion of its length, and said means for biasing each of said rollers comprising for each of said rollers a helical torsion spring located in the hollow portion of its roller and having one end fixed to its roller and its other end fixed to said main carriage.

5. A sheet material cutting apparatus as defined in claim 1 further characterized by said means for biasing each of said rollers comprising for each of said rollers an electrical torque motor attached to said main carriage and drivingly connected to said roller so as to exert a torque thereon when energized.

6. A sheet material cutting apparatus as defined in claim 1 further characterized by two longitudinally extending edge members located adjacent the opposite longitudinal side edges of said layup and isolating said side edges of said layup from atmospheric pressure, said two cover sheets being of such transverse dimensions as to each extend fully transversely across said layup and at least partially across both of said edge members.

7. A sheet material cutting apparatus as defined in claim 1 further characterized by said cutter being of the type having a reciprocating cutting tool which in cutting said layup passes completely therethrough and extends during at least a portion of its stroke beyond the opposite face thereof, said table including a bed of penetrable material for accommodating said tool.

8. A sheet material cutting apparatus as defined in claim 7 further characterized by said bed of penetrable material being air-permeable, and said means for producing a sub-atmospheric pressure adjacent the undersurfaces of said two cover sheets comprising means for applying a sub-atmospheric pressure to said bed of penetrable material and means for conducting said sub-atmospheric pressure from said supporting surface to said undersurfaces of said cover sheets.

9. A sheet material cutting apparatus as defined in claim 8 further characterized by said layup being air-permeable and serving as said means for conducting said sub-atmospheric pressure to said undersurfaces of said cover sheets.

10. A sheet material cutting apparatus as defined in claim 8 further characterized by said layup being air-impermeable, said means for conducting said sub-atmospheric pressure to said undersurfaces of said cover sheets including two edge members each extending along a respective one of the two longitudinal side edges of said layup, each of said two cover sheets having an undersurface configured to provide air conducting channels extending generally transversely of said layup between said cover sheet and the top surface of said layup when said cover sheet is spread over said layup, and each of said two cover sheets being of such transverse dimension as to extend beyond each longitudinal side edge of said layup and onto the adjacent one of said edge members.

11. A sheet material cutting apparatus as defined in claim 1 further characterized by each of said cover sheets having an undersurface configured to provide air conducting channels extending generally transversely of said layup between said cover sheet and the top surface of said layup when said cover sheet is spread over said layup.

* * * * *